(12) United States Patent
Faieta et al.

(10) Patent No.: US 12,116,216 B2
(45) Date of Patent: Oct. 15, 2024

(54) METHOD FOR VARYING THE SPATIAL ARRANGEMENT OF PRODUCTS

(71) Applicant: Fameccanica.Data S.p.A., San Giovanni Teatino (IT)

(72) Inventors: Fabrizio Faieta, San Giovanni Teatino (IT); Dario Galante, San Giovanni Teatino (IT)

(73) Assignee: Fameccanica.Data S.p.A., San Giovanni Teatino Chieti (IT)

( * ) Notice: Subject to any disclaimer, the term of this patent is extended or adjusted under 35 U.S.C. 154(b) by 105 days.

(21) Appl. No.: 17/954,503

(22) Filed: Sep. 28, 2022

(65) Prior Publication Data

US 2023/0108013 A1    Apr. 6, 2023

(30) Foreign Application Priority Data

Sep. 29, 2021   (EP) ..................................... 21199932

(51) Int. Cl.
*B65G 47/31* (2006.01)
*B65G 47/12* (2006.01)
*B65G 47/14* (2006.01)

(52) U.S. Cl.
CPC ............. *B65G 47/31* (2013.01); *B65G 47/12* (2013.01); *B65G 47/1492* (2013.01); *B65G 2811/095* (2013.01)

(58) Field of Classification Search
CPC .... B65G 47/1492; B65G 47/12; B65G 47/31; B65G 2811/095
USPC ................................................. 198/443, 455
See application file for complete search history.

(56) References Cited

U.S. PATENT DOCUMENTS

| | | | | |
|---|---|---|---|---|
| 3,224,553 | A | * | 12/1965 | Campbell .......... B65G 47/1492 |
| | | | | 198/398 |
| 3,259,225 | A | * | 7/1966 | Lehde ..................... A01D 33/00 |
| | | | | 198/786 |
| 6,253,904 | B1 | | 7/2001 | Soldavini |
| 9,630,784 | B2 | * | 4/2017 | Ragan ..................... B65G 47/32 |
| 10,315,859 | B1 | | 6/2019 | Zhao et al. |
| 10,850,929 | B2 | | 12/2020 | Ronchi |
| 10,961,060 | B1 | * | 3/2021 | Zhao ..................... B65G 47/268 |
| 11,186,444 | B2 | * | 11/2021 | Ronchi .................. B25J 9/0096 |
| 2003/0053905 | A1 | | 3/2003 | Luebben et al. |

(Continued)

FOREIGN PATENT DOCUMENTS

| | | | | |
|---|---|---|---|---|
| DE | 2804585 A1 | | 8/1979 | |
| DE | 29921672 U1 | * | 4/2001 | ............. B65G 47/31 |

(Continued)

OTHER PUBLICATIONS

European Search Report dated Feb. 22, 2022. 9 pages.

*Primary Examiner* — James R Bidwell
(74) *Attorney, Agent, or Firm* — RMCK Law Group PLC

(57) ABSTRACT

A method is disclosed for varying a spatial arrangement of randomly arranged, stacked or piled products, particularly to rearrange the products in a way that makes automated handling thereof possible. The method relies on a plurality of subsequent conveyors extending between a product input and a product output, wherein at least one of a conveyor speed a conveyor direction and a conveyor height of a conveyor of the plurality is offset from, respectively, the conveyor speed the conveyor direction, and the conveyor height of a subsequent conveyor in the plurality.

15 Claims, 4 Drawing Sheets

(56) References Cited

U.S. PATENT DOCUMENTS

| | | |
|---|---|---|
| 2013/0104506 A1 | 5/2013 | Renner et al. |
| 2017/0362036 A1 | 12/2017 | Hartmann et al. |
| 2018/0081346 A1 | 3/2018 | Dwivedi et al. |
| 2021/0261354 A1* | 8/2021 | Berg ..................... B65G 43/08 |
| 2022/0081221 A1* | 3/2022 | Beuchert ................ B65G 47/31 |

FOREIGN PATENT DOCUMENTS

| | | |
|---|---|---|
| EP | 0630815 A1 | 12/1994 |
| FR | 2651756 A1 | 3/1991 |
| JP | 2019209276 A | 12/2019 |
| WO | 2010037959 A1 | 4/2010 |

* cited by examiner

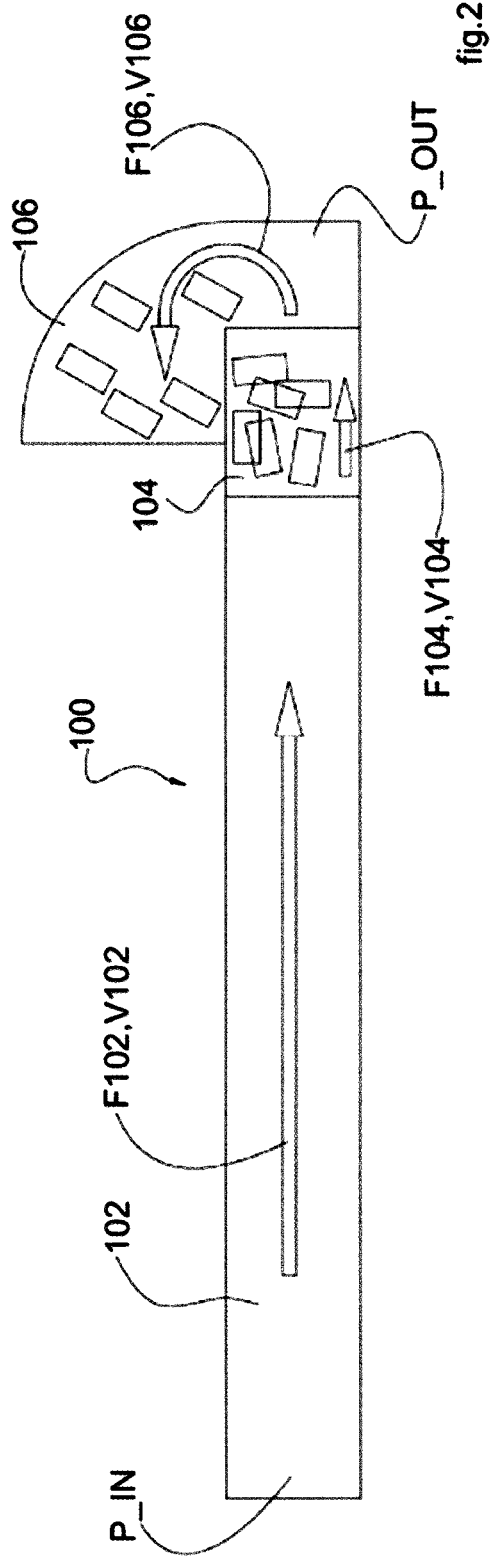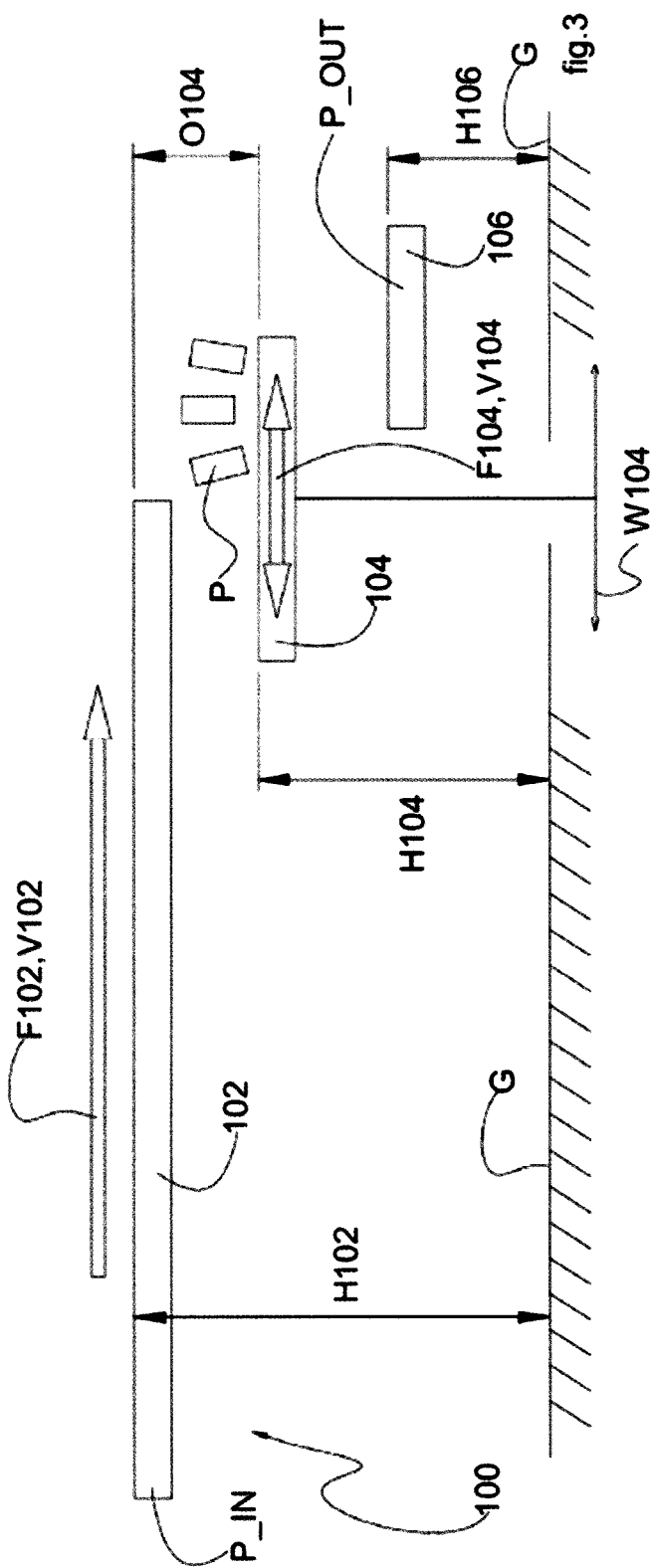

METHOD FOR VARYING THE SPATIAL ARRANGEMENT OF PRODUCTS

CROSS-REFERENCE TO RELATED APPLICATION

This application claims priority to European Patent Application No. 21199932.1 filed Sep. 29, 2021. The disclosure of the above application is incorporated herein by reference in its entirety.

FIELD OF THE INVENTION

The present invention relates to the handling and sorting of products intended to be packaged in sale units.

PRIOR ART

Packaging of products into shipping units comes with a variety of technical problems which have been mostly solved by the prior art especially as far as automatic packaging of the same products into shipping units is concerned.

There is, however, a very specific circumstance where the prior art has left a vacancy as far as the availability of technical solutions for automated packaging: packaging of products into custom-sized sale units, i.e. sale units containing a non-regular number of products (for instance three products in a first sale unit, seven in a second sale unit and so on).

Currently available solutions for packaging products into custom sized sale units are essentially limited to hand packaging. Operators manually pick an initial product batch from large handling containers and sort the same into smaller batches based on the size of the sale unit. Alternatively, the products are individually picked from the handling containers and transferred to custom sized packaging units.

This is largely inefficient, as it is time-consuming (or, equivalently, it has a very low product output per unit time), costly, and is very little prone to automated quality control too.

One of the key problems associated with packaging products into custom-sized sale units is the inherent difficulty in handling random-sized input initial batches of products from the handling containers, i.e. product batches that are variable in number and size and also feature randomly stacked or overlapped products. Storage of the products into large handling containers cannot be dispensed with, as the totally random (as it is a custom one) size of the sale units does not allow any sort of pre-sorting of products to be packaged whatsoever. Unfortunately, these operational constraints are inherently incompatible with automated sorting and/or packaging in that a random amount of randomly arranged products is simply out of handling for automated machines.

OBJECT OF THE INVENTION

The object of the present invention is to solve the above mentioned technical problems. Specifically, it is an object of the invention to provide a method which allows automated packaging of products into custom sized shipping units.

SUMMARY OF THE INVENTION

The object of the invention is achieved by a method having the features of the claims that follow, which form an integral part of the technical disclosure provided herein in relation to the invention.

BRIEF DESCRIPTION OF THE FIGURES

Further features and advantages of the invention will become apparent from the following description with reference to the annexed figures, provided purely by way of non limiting example, wherein:

FIGS. 2 and 3 are, respectively, a plan and a side schematic views of a facility carrying out a method according to second embodiments.

DETAILED DESCRIPTION

Figure 1:
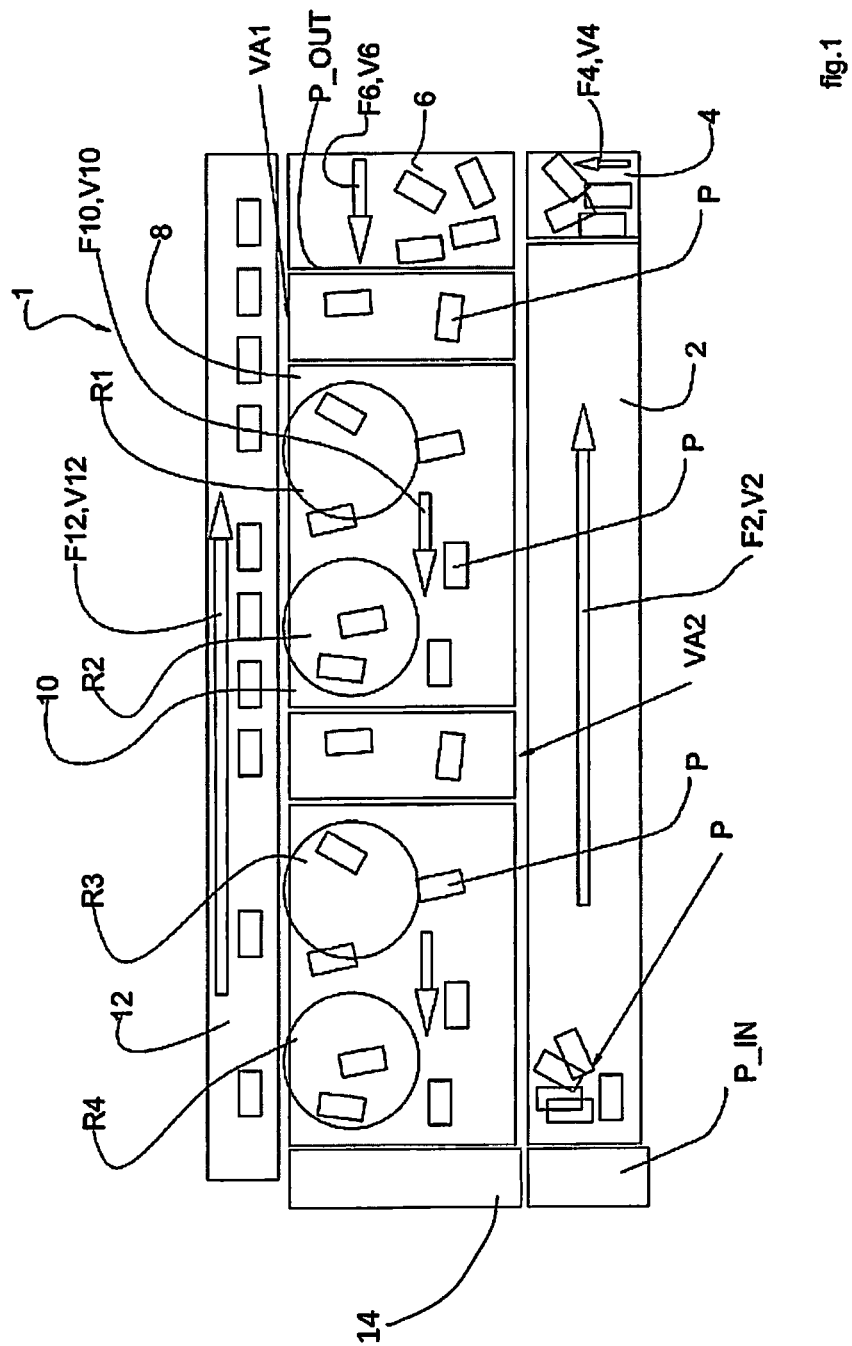
FIG. 1 is a plan schematic view of a facility carrying out a method according to first embodiments.

In various embodiments of the invention, a method is provided that achieves variation of the spatial arrangement of products, particularly for the purpose of automated packaging of the products into custom-sized sale units. The variation in the arrangement of the products achieved by the method of the invention, as will be detailed in the following, allows the further processing of randomly sized and randomly arranged batches of products taken out of handling containers, as the variation of the spatial arrangement essentially results in the deconstruction of the initial—random featured —batch of products into a flow of individually spaced and easy to handle products.

Embodiments of the method of the invention may be carried out by means of facilities illustrated in the figures herein, it being understood that the facilities shown herein are intended purely as illustrative examples. As uses herein, the term "facility" designates as a whole a machine or a complex of cooperating machines or devices, for instance conveyors, picking robots, imaging/vision systems, etc.

In various embodiments of the invention, with reference to the figures, a method for varying the spatial arrangement of products comprises:

providing a plurality of subsequent conveyors extending between a product input P_IN and a product output P_OUT, operating each conveyor according to a respective conveyor speed and a respective conveyor direction, inputting a product batch to said plurality of subsequent conveyors, whereby the product batch travels from the product input P_IN to the product output P_OUT and is sequentially relayed from each conveyor of the plurality to a subsequent conveyor of the plurality, wherein at least one of the conveyor speed, the conveyor direction, and a conveyor height of a conveyor of the plurality is offset from, respectively, the conveyor speed, the conveyor direction, and the conveyor height of the subsequent conveyor in the plurality.

As used herein, "conveyor speed" is meant to designate the traveling speed of mobile elements (e.g. a belt, a tread, chain links, etc) of the conveyor, particularly at the section that carries the products P. As used herein "conveyor direction" is meant to designate the feeding direction set by the conveyor motion to the products carried by the very conveyor. As used herein, "conveyor height" is meant to designate the ground height of the mobile surfaces of the conveyor that carry the products P. "ground" is intended to designate a common reference (zero) value from which the height is calculated.

In other terms, the method of the invention—and the set up of the facility accordingly—essentially achieves a "spreading" of products P in the initial product batches by relying on offsets in relevant parameters of the conveyors including, as noted, conveyor speed, conveyor direction, and conveyor height. If a batch of products P were to negotiate a plurality of conveyors with uniform such parameters, the changes from the initial arrangement or configuration would be very little, if at all, thus essentially—so to say—shifting the technical handling problem from the product in put to the product output.

Conversely, upon meeting any of the above offset, a change in the spatial arrangement of products takes place. As a general remark, any such offset has a deconstructive effect in respect of a stack or a pile of randomly arranged products P: as the stack or pile (or whatever arrangement of products) travels along a first conveyor of the plurality, the conveyor speed, conveyor direction, or conveyor height offset (possibly in combination with each other) progressively subject each product in the stack or pile P to a change in motion or attitude features thereof as it meets the offset.

Products P that can be processed by the method of the invention include preferably sanitary products such as sanitary napkins, but the method is in principle extendable to any product susceptible of being sold in packaged sale units (especially custom sized units).

For instance, when densely packed products P travel in a first conveyor direction drawn by a first conveyor having a first conveyor speed, the transition of the products P to a second, subsequent, conveyor with a higher conveyor speed accelerates each product individually as soon as the leading section thereof engages the second conveyor to an extent that produces a grip force sufficient for the second conveyor to draw the product P away from the remainder of the pack and accelerate it to the second conveyor speed. The delay in the grip-and-acceleration sequence experienced by the remaining products P (which is determined i.e. by the position and the arrangement thereof onto the first conveyor) results in a spreading or spacing of the products P. In other terms, the products P are gripped and accelerated at different moments in time based on their position and arrangement on the first conveyor, and accordingly the moment at which they meet the (conveyor speed) offset and the difference in the individual starts of acceleration leads to a time-staggered breakaway of each product from the rest of the pack.

Similarly, with reference now to a conveyor direction offset, when densely packed products P travel in a first conveyor direction drawn by a first conveyor having a first conveyor speed, the transition of the products P to a second, subsequent, conveyor with a different conveyor direction (for instance, incident to the first conveyor direction) causes the break away of each product P from the pack as soon as the leading section thereof engages the second conveyor to an extent that produces a grip force sufficient for the second conveyor to draw the product P away from the remainder of the pack and deviate its motion to the second conveyor direction. The delay in the grip-and-deviation sequence experienced by the remaining products P (which is determined i.e. by the position and the arrangement thereof onto the first conveyor) results in a spreading or spacing of the products P.

In other terms, the products P are gripped and deviated at different moments in time based on their position and arrangement on the first conveyor, and accordingly the moment at which they meet the (conveyor direction) offset and the difference in the individual starts of deviation leads to a time-staggered breakaway of each product P from the rest of the pack.

As far as conveyor height offset, when densely packed products P travel in a first conveyor direction drawn by a first conveyor having a first conveyor height, the transition of the products P to a second, subsequent, conveyor with a different conveyor height (generally, and preferably—for obvious reasons—lower than the first conveyor height) causes the break away of each product P from the pack as soon as the leading section thereof leans out of the first conveyor to an extent that causes the product P to fall onto the second conveyor. The delay in the lean-and-fall sequence experienced by the remaining products P (which is determined i.e. by the position and the arrangement thereof onto the first conveyor) results in a spreading or spacing of the products P.

In other terms, the products P lean out and fall at different moments in time based on their position and arrangement on the first conveyor, and accordingly the moment at which they meet the (conveyor height) offset and the difference in the individual lean out times leads to a time-staggered breakaway of each product P from the rest of the pack.

When multiple offsets are combined at each conveyor transition, the effects of each offset are combined as well.

In preferred embodiments, at least one of the conveyor speed, the conveyor direction, and a conveyor height of each conveyor of the plurality is offset from, respectively, the conveyor speed, the conveyor direction, and the conveyor height of the subsequent conveyor in the plurality, whereby upon each conveyor change an offset is met by the products P traveling from the product in put to the product output.

In embodiments, the conveyor height of each conveyor of the plurality is offset from the conveyor height of the subsequent conveyor in the plurality. This may occur in combination with other offsets at each conveyor transition, for instance—while the conveyor height offset occurs at each conveyor transition, some of (or all of) the conveyor height offsets may be combined with a conveyor speed offset (preferably, see for example FIGS. 2 to 4D), and/or with a conveyor direction offset.

In embodiments, the conveyor speed of each conveyor of the plurality is offset from the conveyor speed of the subsequent conveyor in the plurality. This may occur in combination with other offsets at each conveyor transition, for instance—while the conveyor speed offset occurs at each conveyor transition, some of (or all of) the conveyor speed offsets may be combined with a conveyor direction offset (preferably, see for example FIG. 1), and/or with a conveyor height offset. Advantageously, the conveyor speed offset may be variable in time (this applies regardless of the embodiment considered).

In embodiments, the conveyor direction of each conveyor of the plurality is offset from the conveyor direction of the subsequent conveyor in the plurality. This may occur in combination with other offsets at each conveyor transition, for instance—while the conveyor direction offset occurs at each conveyor transition, some of (or all of) the conveyor direction offsets may be combined with a conveyor speed offset (preferably, see for example FIG. 1), and/or with a conveyor height offset.

With reference to FIG. 1, reference number 1 designates as a whole a facility that carries out first embodiments of the method of the invention. The facility 1 comprises a first conveyor 2, a second conveyor 4 subsequent to the first conveyor, and a third conveyor 6 subsequent to the second conveyor 4. The second conveyor 4 has a conveyor direction F4 offset from a conveyor direction F2 of the first conveyor 2 (preferably directions F2 and F4 lie at a right angle), and the third conveyor 6 has a conveyor direction F6 offset from the conveyor direction F4 of the second conveyor 4 (preferably directions F4 and F6 lie at a right angle, whereby direction F6 is parallel to direction F2 to define a U-shaped combined conveyor path). In preferred embodiments, the second conveyor 4 has a conveyor speed V4 higher than a conveyor speed V2 of the first conveyor 2 and the third conveyor 6 has a conveyor speed V6 higher than the conveyor speed V4 of the second conveyor 4. This is exemplary of embodiments wherein a combination of conveyor speed and conveyor direction offset are combined at each conveyor transition. Preferably, no conveyor height offsets are envisaged in the facility 1. The product input P_IN is located upstream of the conveyor 2 (reference is made to the conveyor direction F2) and the product output P_OUT is located downstream of the conveyor 6 (reference is made to the conveyor direction F6).

The facility 1 may advantageously comprise a product sorting apparatus. The product sorting apparatus comprises a product sorting area 8 located downstream of the product output P_OUT and configured to receive the spaced products output by the conveyor 6. The sorting area 8 may advantageously itself be provided by a sorting conveyor 10 moving in a conveyor direction F10 that prosecutes the conveyor direction F6 (i.e. is aligned thereto), and preferably having no conveyor speed offset with respect to the conveyor 6. The function of the sorting conveyor 10 is essentially that of transferring the products from the product output P_OUT to the product sorting area 8.

One or more picking robots R1, R2, R3, R4 are provided at the sorting area, preferably in an overhead position. Overhead picking robots are per se known and will not be described in detail. The picking robots R1-R4 are assisted by means of at least one vision system positioned at the sorting conveyor 10 and operating at one or more vision areas VA1, VA2 along the sorting conveyor 10 in the direction F10). Each vision system is configured for identifying the products P at the sorting conveyor 10 and guiding the one or more picking robots R1-R4 to locations of the identified products. Each picking robot R1-R4 is so configured for picking products from the product sorting area 8 and releasing batches of picked products P onto a discharge conveyor 12, the batches of picked products being variable in size according to the size of the sale unit. Conveniently, the sorting conveyor 10 gives out to a recirculation chute or conveyor 14, which recirculates non-picked or non identified products P to the product input P_IN.

When in operation, the facility 1 is supplied with a large initial batch of products P which are manually withdrawn from large handling containers by operators and dropped altogether at the product input P_IN. the number of products P in the initial batch is largely variable depending on the withdrawal by the operators, and randomly arranged. When dropped at the product input P_IN, the products P immediately fall onto the first conveyor 2 and begin traveling towards the product output P_OUT in the conveyor direction F2. When the products P meet the conveyor transition between the first conveyor 2 and the second conveyor 4 the combination of conveyor speed offset and conveyor direction offset (F2 to F4) deconstructs the original arrangement of products P on the conveyor 2 to a new arrangement having a higher spread. The products P are sequentially separated based on the foregoing description regarding the conveyor speed offset (grip-and-acceleration sequence) and the conveyor direction (grip-and-deviation) offset.

A second spread of the products P occurs at the conveyor transition between the second conveyor 4 and the third conveyor 6, with a new conveyor direction offset (F4 to F6) and a new conveyor speed offset. Again, the products P are sequentially (further) separated based on the foregoing description regarding the conveyor speed offset (grip-and-acceleration sequence) and the conveyor direction (grip-and-deviation) offset. Accordingly, the products P are delivered to the product output P_OUT by the conveyor 6 as spread and spaced items, ready to enter the product sorting area 8.

The initial arrangement of the products P at the product input P_IN featured a random distribution of stacked, piled, and altogether densely packed products P: such an arrangement makes it impossible for the products P to be handled automatically, as robotic handling/picking devices (such as the picking robots R1-R4) would simply be unable to correctly locate a product to be picked due to the picking area being simply too crowded. In such circumstances, not even vision systems are capable of assisting the picking/handling devices to locate products due to the very arrangement thereof.

Conversely, thanks to the method of the invention, the products P delivered to the product output P_OUT and on to the sorting area 8 are sufficiently spaced and spread to allow identification hereof by the vision system(s) and picking by the robots R1-R4, which are accordingly enabled to pick individual products P from the product sorting areas 8 (particularly from the sorting conveyor 10) and releasing batches of picked products P onto the discharge conveyor 12, wherein the batches of products assembled (released) onto the conveyor 12 are differently sized based on the size of the associated sale unit. Non-picked or non-identified products P (for instance products for which the spreading action eventually turned out to be insufficient) are simply recirculated to the product input P_IN by the recirculation chute or conveyor 14.

It is noted that the facility 1 can operate even without a conveyor speed offset between subsequent conveyors. As already described, the sole conveyor direction offset may be enough to achieve the desired product spreading and spacing. Clearly, if the facility 1 so allows, the addition of a conveyor speed offset increases the product spread, or— equivalently—allows the processing of larger initial batches of products P while meeting spread and spacing requirements.

With reference to FIGS. 2 to 4D, reference number 100 designates as a whole a facility for carrying out a method according to second embodiments of the invention.

The facility 100 is illustrated only as far as the conveyors implementing the method are concerned. Further co-operating devices or units are not shown, but it shall be understood that the provision of a product sorting area downstream of the product output P_OUT is of course possible.

In the facility 100 the plurality of subsequent conveyors comprises a first conveyor 102 and a second conveyor 106 (which is not per se necessary to performance of the method, as it is essentially a transfer conveyor) subsequent to the first conveyor 102, wherein the second conveyor 104 has a conveyor height H104 that is lower than a conveyor height H102 of the first conveyor 102, and no conveyor direction offset with respect to the first conveyor 102. Accordingly, there is a height offset O104 between the conveyor 104 and the conveyor 102. Heights H104 and H102 (as well as H106 for the conveyor 106) are measured from the ground or common reference G.

The conveyors 102, 104 each have a conveyor direction F102, F104 aligned with one another. The product output P_OUT is located at the conveyor 106 downstream of the second conveyor 104 at a lower height H106 as compared to the height H104, so there is another height offset even at the product output P_OUT, which is preferably provided as a transfer conveyor 106. Preferred embodiments feature a curved path transfer conveyor to accommodate a turn towards—for instance—a product sorting area without making the facility too long in the process direction. The conveyor 102 is operated at a conveyor speed V102, and the conveyor 104 is operated at a conveyor speed V104, which is variable according to the description that follows.

The second conveyor 104 is also movable relative to the first conveyor 102 in the conveyor direction F104 (back and forth, speed W104) so as to provide a variation in an overlap OV between the first conveyor 102 and the second conveyor 104. This means that the absolute speed of the products P moving over the conveyor 104 is a combination of speeds V104 and W104, of course subject to the orientation thereof, wherein V104 is the conveyor speed meant as the speed at which the mobile section(s) of the conveyor (e.g. a chain. A belt, etc.) move relative to the fixed section(s) thereof—hence the speed at which the products P move along through the conveyor 104, while W104 is a translational speed of the conveyor 104 as a whole, i.e. is a speed that both the mobile section(s) and the fixed section(s) of the conveyor are subject to. In other terms, a product moving along the conveyor at a speed V104 relative to the fixed section(s) thereof may further be subject to a further speed component W104 owing to the translation of the conveyor as a whole with respect to an outer reference system, whereby the absolute speed of the products P on the conveyor 104 with respect to the outer reference system is a combination of speeds V104 and W104 (taking into account the orientation thereof, of course).

Figure 4A:
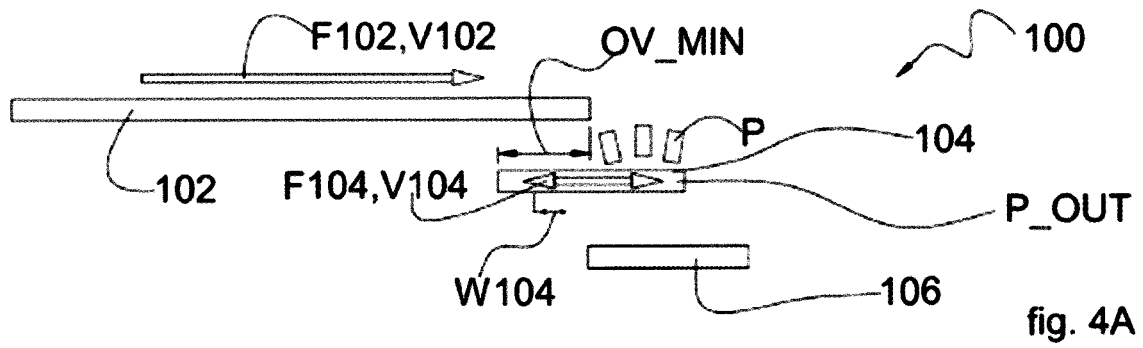
FIGS. 4A to 4D are sequential side views of the facility of FIGS. 2 and 3, FIGS. 5, 7 and 6, 8 are, respectively, a plan and a side schematic views of further aspects and facilities involved in the method of the invention.
Figure 4B:
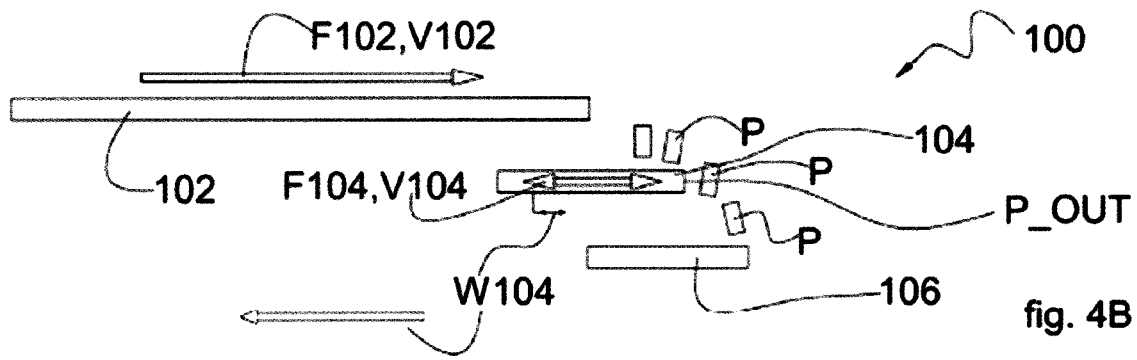
Figure 4C:
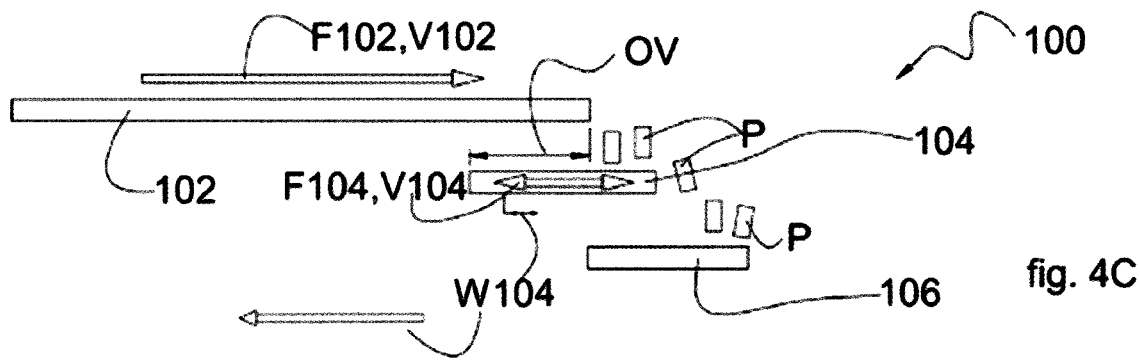
Figure 4D:
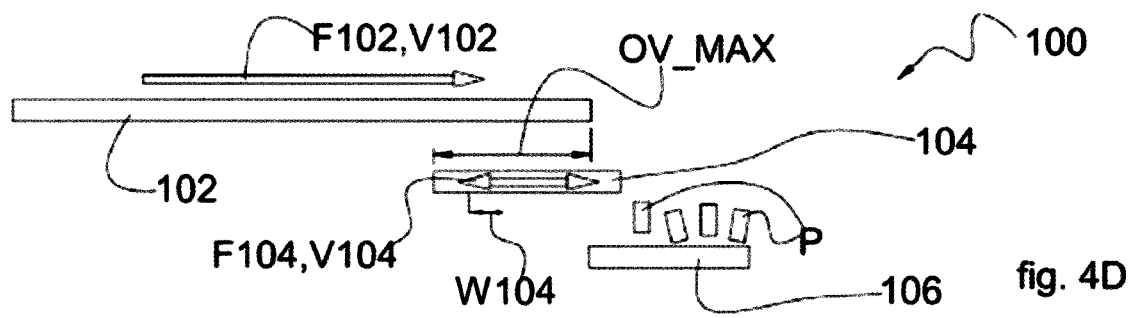
Figure 5:
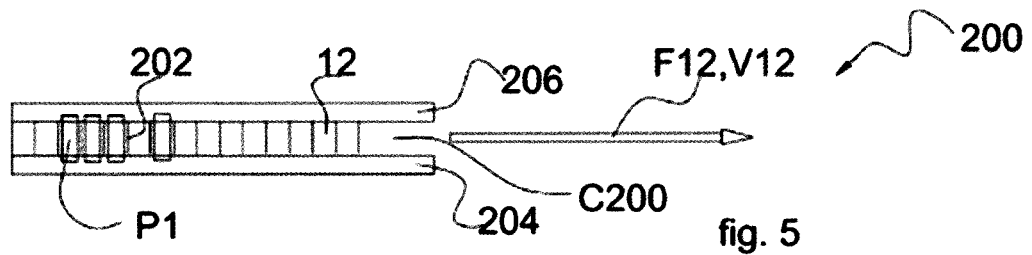
Figure 6:
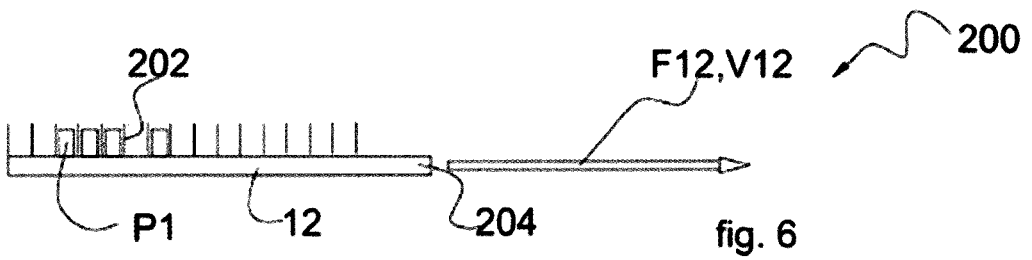
Figure 7:
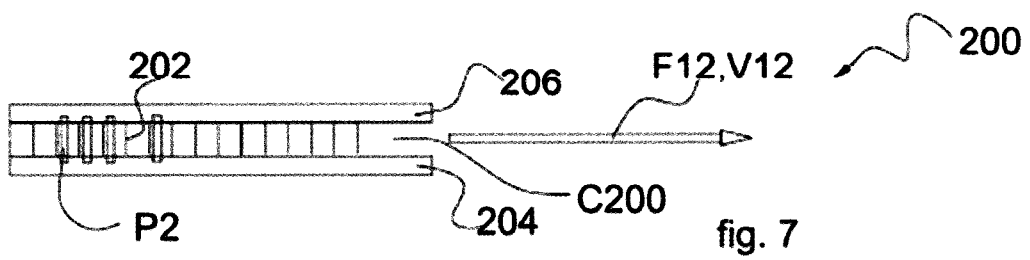
Figure 8:
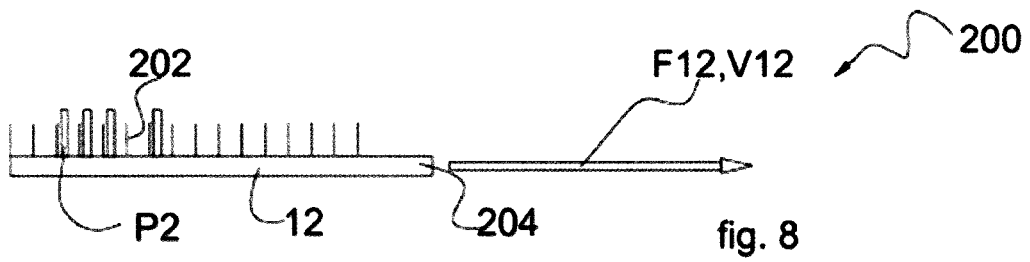
Figure 9:
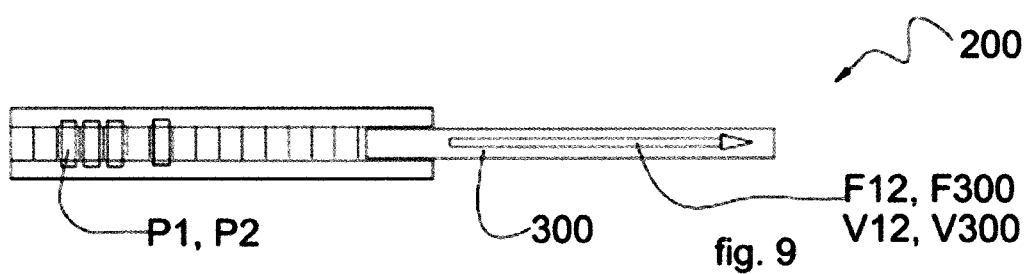
FIG. 9 is a plan view representing yet a further aspect and facility involved in the method according to the invention.

The conveyor 104 is movable relative to the conveyor 102 from a condition of minimum overlap OV_MIN illustrated in FIG. 4A, and a condition of maximum overlap illustrated in FIG. 4D.

The method according to the second embodiments comprises:
 operating the first conveyor 102 with a first conveyor speed V102 to transfer products P from the product input P_IN to the second conveyor 104 (FIG. 4A)
 positioning the second conveyor 104 at a minimum overlap OV_MIN with the first conveyor 102 and operating the second conveyor 104 at no conveyor speed (i.e. the conveyor speed V104 is zero); in other terms, whatever the movable members of the conveyor 104, at this stage they are not operated,
 receiving the products P onto the second conveyor 104, wherein the products P negotiate the height offset between the conveyors 102 and 104 as they are set in motion by the conveyor 102 moving at the conveyor speed V102,
 moving the second conveyor 104 relative to the first conveyor 102 with a speed W104 from the condition of minimum overlap OV_MIN to a condition of maximum overlap (FIGS. 4C, 4D),
 operating the second conveyor 104 at a conveyor speed V104 (higher than zero and oriented towards the product output P_OUT) to transfer the products P to the product output P_OUT while moving the second conveyor 104 relative to the first conveyor 102 from the condition of minimum overlap OV_MIN to the condition of maximum overlap OV_MAX with a speed W104 pointing opposite to the product output P_OUT. Preferably, the conveyor speed V104 is also higher than the conveyor speed V102, possibly by a measure such that the compound velocity W104+V104 exceeds the conveyor speed V102 anyway, even when speed W104 points opposite to the product output P_OUT. This maximises product spreading as it achieves a combined height offset and conveyor speed offset action.

The latter step encourages the products P off the second conveyor 104 and onto the conveyor 106 and promotes a further spreading and spacing of the products P. It is a combination of a conveyor speed offset (the conveyor speed of the first conveyor 102 is constant, while the conveyor speed of the conveyor 104 is time-variable from zero to a predetermined conveyor speed and back when the conveyor 104 shuttles back to the minimum overlap position).

Once this latter step is over, the conveyor 104 is shuttled back to the condition of minimum overlap OV_MIN of FIG. 4A and the cycle restarts upon reception of a new scrambled flow of products P. Essentially, the provision of a shuttling conveyor 104 allows construction of a more compact facility in the conveyor direction(s): as visible in FIGS. 4A to 4D, the conveyor 106 can be arranged just downstream of the conveyor 102, as if it were to directly received by the conveyor 106. The conveyor 104 hovers above the conveyor 106 just as long as required to receive the products P from the conveyor 102, then starts moving away from the conveyor 106 and at the same time relays the products P to the conveyor 106 itself, which is gradually uncovered by the retraction motion of the conveyor 104 and made available for the products P to land onto.

Per the above description, the products P that are delivered to the product output P_OUT are spread and spaced as compared to the initial arrangement at the product input. Similarly to the facility 1, this allows further processing of the products P at a product sorting area 8 identical—and identically operating—to that described in respect of the facility 1.

According to an advantageous aspect of the present invention, in any embodiments of the method the discharge conveyor 12 may be integrated in a discharge facility 200 (FIGS. 5-9) which is configured to process different formats of the product P while also facilitating relaying of the assembled product batches to a further processing facility or stage.

In embodiments, the discharge facility 200 comprises the discharge conveyor 12 provided with a plurality of vanes or pins 202 configured for individually receiving products P released by the picking robots R1-R4 (or equivalent handling units). Both the conveyor 12 and the pins or vanes 202 are arranged between a pair of slide plates 204, 206, with the conveyor 102 essentially lying flush with the slide plates 204, 206 so that only the pins or vanes 202 stick out of the slide plates 204, 206. The conveyor 12 operates according to a conveyor direction F12 and a conveyor speed V12, while the slide plates 204, 206 are fixed in position. The slide plates 204, 206 extend over the end of the conveyor 12 to define a channel or track C200.

This arrangement allows the handling of different product formats, as shown in FIGS. 5-8: products P1 are thick and squat, while products P2 are thin and elongated. The difference in size and format are accommodated by the slide plates 204, 206: the portions of products P1, P2 that lean out of the conveyor 102 are supported by (and slide along) the slide plates 204, 206, with the conveyor only taking care of keeping them in motion.

The track or channel C200 may advantageously serve as a mating interface for a takeaway conveyor 300 having a conveyor direction F300 identical (prosecuting) the direction F12, and a conveyor speed V300 which is preferably identical to the speed V12. The takeaway conveyor 300 receives the products P at the end of the conveyor 12 and for the length of the channel or track C200 is still assisted by the slide plates 204, 206 as far as supporting products P1, P2 having different sizes. References P1, P2 are indistinctly applied in FIG. 9 essentially to convey that the relay to the take away conveyor 300 can be done regardless of the product size.

Naturally, while the principle of the invention remains the same, the details of construction and the embodiments may widely vary with respect to what has been described and illustrated purely by way of example, without departing from the scope of the present invention.

The invention claimed is:

1. A method for varying a spatial arrangement of products, comprising:
    providing a plurality of subsequent conveyors extending between a product input and a product output,
    operating each conveyor of the plurality of subsequent conveyors according to a respective conveyor speed and a respective conveyor direction,
    inputting products or a product batch to said plurality of subsequent conveyors, whereby the products or product batch travels from the product input to the product output,
    wherein said plurality of subsequent conveyors comprises a first conveyor and a second conveyor subsequent to the first conveyor, and wherein the second conveyor has a lower conveyor height than the first conveyor,
    wherein the second conveyor is movable relative to the first conveyor in the conveyor direction so as to provide a variation in an overlap between the first conveyor and the second conveyor, and
    wherein the method further comprises:
    operating the first conveyor with a first conveyor speed to transfer products from the product input to the second conveyor,
    positioning the second conveyor at a minimum overlap with the first conveyor and operating the second conveyor at no conveyor speed,
    receiving the products onto the second conveyor,
    moving the second conveyor relative to the first conveyor from the condition of minimum overlap to a condition of maximum overlap, and
    operating the second conveyor at a second conveyor speed to transfer the products to the product output.

2. The method of claim 1, comprising operating the second conveyor at the second conveyor speed to transfer the products to the product output while moving the second conveyor relative to the first conveyor from the condition of minimum overlap to the condition of maximum overlap.

3. The method of claim 1, wherein the second conveyor has no conveyor direction offset with respect to the first conveyor.

4. The method of claim 1, wherein at least one of the respective conveyor speed, the respective conveyor direction, and a respective conveyor height of one conveyor of the plurality of subsequent conveyors is offset from, respectively, the respective conveyor speed, the respective conveyor direction, and the respective conveyor height of a subsequent conveyor in the plurality of subsequent conveyors.

5. The method of claim 1, wherein the product batch that travels from the product input to the product output is sequentially relayed from each conveyor of the plurality of subsequent conveyors to a subsequent conveyor of the plurality of subsequent conveyors.

6. The method of claim 1, wherein the respective conveyor speed of each conveyor of the plurality of subsequent conveyors is offset from the respective conveyor speed of a subsequent conveyor in the plurality of subsequent conveyors.

7. The method of claim 6, wherein the offset in the respective conveyor speed is variable in time.

8. The method of claim 1, wherein the product output has a lower conveyor height than the second conveyor, and wherein the product output is provided by a transfer conveyor.

9. The method of claim 1, further comprising:
    transferring the products from the product output to a product sorting area, and
    picking products from the product sorting area and releasing batches of picked products onto a discharge conveyor.

10. The method of claim 9, wherein said product sorting area comprises a sorting conveyor, and wherein said picking products from the product sorting area comprises:
    providing one or more picking robots,
    assisting the one or more picking robots by means of at least one vision system positioned at the sorting conveyor, the at least one vision system being configured for identifying the products at the product sorting area and guiding the one or more picking robots to locations of identified products at the sorting area, and
    recirculating non-picked products to the product input.

11. A facility comprising a plurality of subsequent conveyors extending between a product input and a product output, the facility comprising:
    each conveyor of the plurality of subsequent conveyors being configured to be operated according to a respective conveyor speed and a respective conveyor direction , and being configured for sequentially relaying products to a subsequent conveyor of the plurality of subsequent conveyors,
    said plurality of subsequent conveyors comprises a first conveyor and a second conveyor subsequent to the first conveyor, and wherein the second conveyor has a lower conveyor height than the first conveyor, and
    wherein the second conveyor is movable relative to the first conveyor in a second conveyor direction so as to provide a variation in an overlap between the first conveyor and the second conveyor.

12. The facility according to claim 11, further comprising a product sorting area configured for receiving products from said product output,
    the product sorting area including a sorting conveyor, one or more picking robots at the product sorting area, and one or more vision systems positioned at the sorting conveyor,
    the one or more vision systems being configured for identifying the products at the product sorting area and guiding the one or more picking robots to locations of identified products at the sorting area,
    wherein the one or more picking robots are further configured for releasing products picked from the sorting area onto a discharge conveyor.

13. The facility according to claim 12, wherein:
said discharge conveyor is provided with a plurality of vanes or pins configured for individually receiving products released by said one or more picking robots,
the discharge conveyor and the plurality of vanes or pins are arranged between a pair of slide plates, and
the pair of slide plates extend over an end of the discharge conveyor to define a channel or track, the channel or track being configured to receive a takeaway conveyor.

14. The facility of claim 11, wherein at least one of the respective conveyor speed, the respective conveyor direction, and a respective conveyor height of one conveyor of the plurality of subsequent conveyors is offset from, respectively, the respective conveyor speed, the respective conveyor direction, and the respective conveyor height of a subsequent conveyor in the plurality of subsequent conveyors.

15. The facility of claim 11, wherein the second conveyor has no conveyor direction offset with respect to the first conveyor.

* * * * *

UNITED STATES PATENT AND TRADEMARK OFFICE
CERTIFICATE OF CORRECTION

Page 1 of 1

PATENT NO. : 12,116,216 B2
APPLICATION NO. : 17/954503
DATED : October 15, 2024
INVENTOR(S) : Fabrizio Faieta and Dario Galante It is certified that error appears in the above-identified patent and that said Letters Patent is hereby corrected as shown below:

On the Title Page

Item (71) Applicant address information should be listed as:
- Fameccanica.Data S.p.A., San Giovanni Teatino (Chieti), ITALY -

Item (72) Inventor address information should be listed as:
- Fabrizio FAIETA, San Giovanni Teatino (Chieti), ITALY
Dario GALANTE, San Giovanni Teatino (Chieti), ITALY -

Signed and Sealed this
Twenty-fifth Day of March, 2025

Coke Morgan Stewart
*Acting Director of the United States Patent and Trademark Office*